2,813,766

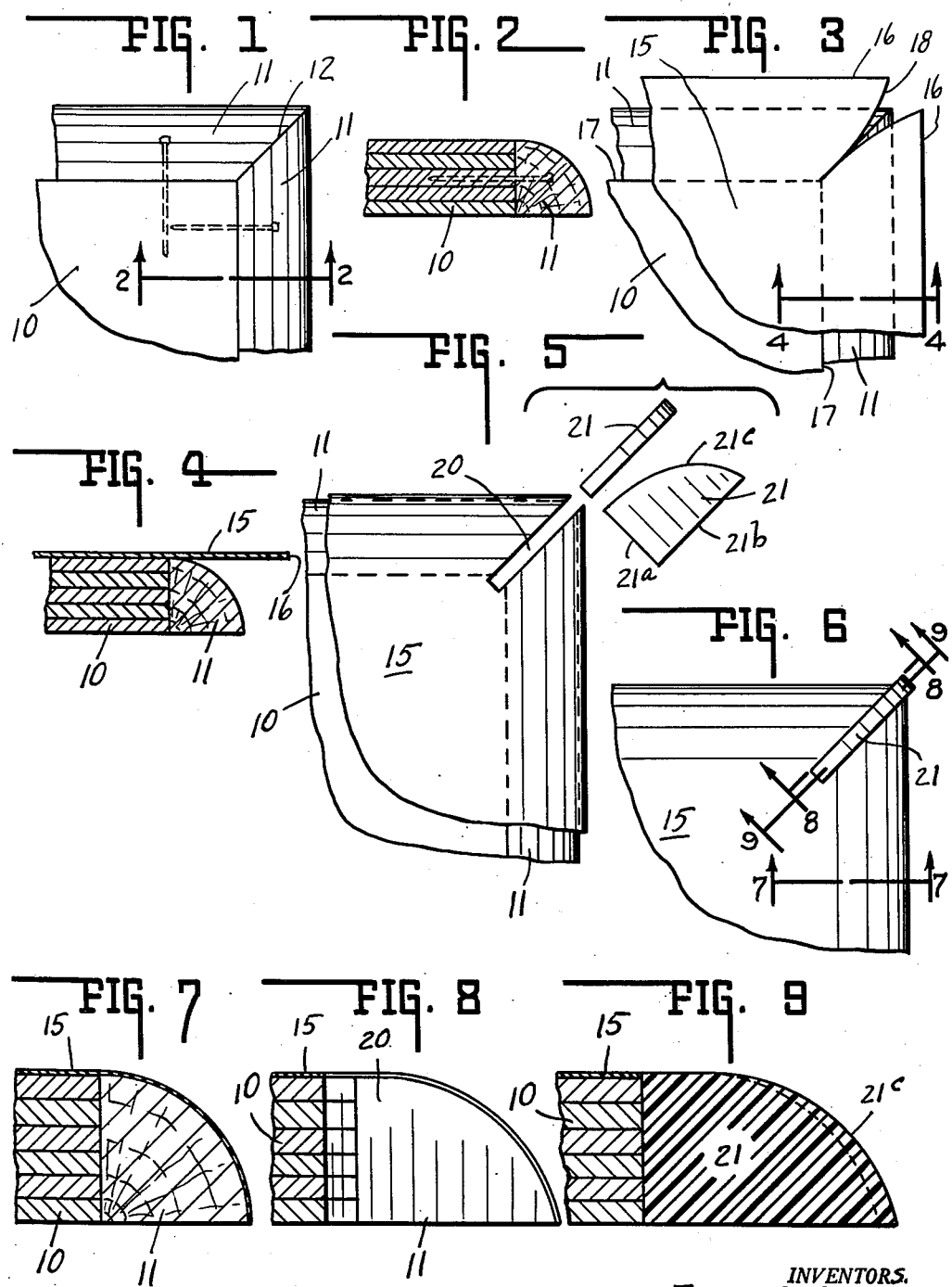

TABLE TOP CONSTRUCTION

Emery D. Shumaker, Brownsburg, and James H. Bowman, Indianapolis, Ind., assignors to Plastic Top Fabricators, Inc., Indianapolis, Ind., a corporation of Indiana Application April 4, 1956, Serial No. 576,192

3 Claims. (Cl. 311—106)

This invention relates to table tops and to methods of making table tops; and is particularly directed to novel laminated table top structures which have a continuous smooth and sanitary surface over the top and side edges thereof and are characterized by the absence of the usual metal moldings for finishing the table edges.

In the co-pending application filed on March 8, 1956, Serial No. 570,257, and entitled "Edging Press," a machine is disclosed for forming a sheet of plastic-type material to the top surface and rounded edges of a core for table and counter tops. There persists the problem of making a strong watertight and neat looking junction at the corners of the core where the two rounded edges of the laminations meet. Where the table tops may be stood on their edges during handling, the corners are particularly vulnerable to mechanical damage.

The object of this invention is to provide an improved table top which has a mechanically strong and neatly finished corner structure, the side edges of which are rounded yet laminated in accordance with and after the teachings of said co-pending application.

The objects of this invention are accomplished by first cutting a rectangular core board and either milling a quarter round curved along the top edges of the core or attaching quarter-round molding strips to the core edges. A sheet of plastic-like material is then formed over the top surface of the core and around the quarter-round edges and glued in place. Finally, notches are cut in each corner through the plastic lamination, through the quarter-round strips, if any, and into the core board. Into the notches are fitted wedges or plates of hardened plastic or rubber-like material and glued to the exposed cut surfaces of the plastic sheet, strips and core.

Other features and objects of this invention will become apparent to those skilled in the art by referring to the specific embodiment described in the following specification specifically defined in the attached claims and shown in the accompanying drawing, in which:

Fig. 1 is a sectional plan view of a table top core,

Fig. 2 is a sectional view taken on line 2—2 of Fig. 1,

Fig. 3 is a plan sectional view of the core with plastic sheet in place for forming, Fig. 4 is a sectional view on line 4—4 of Fig. 3, Fig. 5 is an exploded sectional plan view of the laminated table top of this invention with corner notches and the discs therefor, Fig. 6 is a plan view of one corner of the finished table top, Fig. 7 is a sectional view taken on line 7—7 of Fig. 6, Fig. 8 is a sectional view taken on line 8—8 of Fig. 6, and Fig. 9 is a sectional view taken on line 9—9 of Fig. 6.

Referring first to Figs. 1 and 2, the rectangular core board 10 is preferably of the commercially obtainable plywood type, and for most domestic table tops comprises a 5- or 7-ply board of full 1 inch or 1⅛ inch thickness. The core is provided with a quarter-round edge along each of its four top edges. The curved surface at the core edges may be milled directly on the core board with a quarter-round shaping tool. Where, however, the end grain of the core plies does not finish smoothly, it is preferred that strips 11 of quarter-round molding be fastened, as with glue and nails or screws, to the core edges. As shown in Fig. 1, the strips 11 are mitered on a 45° angle at the corners 12.

In manufacture, it has been found convenient to first apply the sheet 15, Fig. 3, of plastic-like material, such as "Formica," to the top surface of the core 10 with the edge portions 16 of the sheet extending a measured distance beyond the core boundaries 17. When the quarter-round strips 11 are glued and are nailed in place and the four extended edge portions 16 successively heated and rolled downward and over the quarter round as described in greater detail in said co-pending application, supra. The edges of the V-notch 18 at each corner of the sheet 15 substantially close along a line at about 45° with the sides of the core as adjacent edge portions 16 of the sheet are curved. It has been found, unfortunately, that the compound curved at the junctions of the edge portions 18 at the table corners does not close uniformly during high speed manufacture.

According to an important feature of this invention, a straight-sided notch 20 is cut in each corner with a wide saw blade or shaping tool. The notch 20 is relatively wide and is conveniently cut by a dado head, with the outside blades of the head spaced the desired distance apart to cut the notch in one pass. The cut is made through the plastic sheet 15, through the quarter-round strips 11 and into the core 10, as best shown in Fig. 5. Irregularities in the formed plastic sheet and in the quarter-round strips at the corners are removed by such a cut. Finally, a wedge or plate 21 is fitted and glued into the notch 20. The edge is preferably of hardened plastic or rubber composition and has a thickness equal to the width of notch 20 and has an outline approximately pie-shaped to conform with the face of the cut. The two right angle edges 21a and 21b of the wedge bear against the bottom of the cut 20 in the core and come flush with the bottom surface of the core and strip. The curve of edge 21c of the disc is commensurate with the curvature of the corner. If desired, however, the wedge may be so sized that the curve 21c of the wedge may protrude a short distance beyond the surface of the table top lamination as shown in Figs. 6 and 9. When the wedge is of hard rubber composition the extension of the wedge serves as a bumper to protect the table top from mechanical damage. The rounded edge of the table top will not touch the floor when the table top is stood on one edge.

Importantly, the wedge extends diagonally across the cut edge of the plastic sheet and the ends of the quarter-round strips and into the core thus mechanically binding the components of the table top together and making the table particularly sturdy. The top sheet cannot loosen or "lift" at the corners.

While we have described above the principles of our invention in connection with specific apparatus, it is to be clearly understood that this description is made only by way of example and not as a limitation to the scope of our invention.

The invention claimed is:

1. A table top assembly comprising a rectangular laminated board with a substantially quarter-rounded edge along the side edge of the core, a rectangular sheet of plastic-type material with a V-shaped notch in each corner laid on the core and the edge portions of the sheet formed and adhered to the rounded edges of the core; each corner of the core and sheet having a notch cut along a line bisecting the corners, and a wedge fitted and adhesively fastened in each notch to the cut edges of the core and sheet, the exposed edges of the wedges being substantially flush with the contiguous surfaces of the core and sheet.

2. A table top assembly comprising a rectangular core board of predetermined thickness, quarter-round molding strips fastened to each edge of the core board with the rounded surface of the strips substantially flush with one flat surface of the board; a sheet of plastic-like material formed and adhered to the flat and curved surfaces of the core board and strips, a notch being cut into each corner through the sheet and strips and into the core board; and a plate fitted into each notch with the exposed edges of the plates conforming to the contiguous surfaces of the core, strips, and sheet.

3. In the table top assembly defined in claim 2, one edge of each of said plates extending slightly beyond the rounded edge portion of said sheet to mechanically protect the sheet.

References Cited in the file of this patent
UNITED STATES PATENTS

| | | |
|---|---|---|
| 2,186,530 | Jones | Jan. 9, 1940 |
| 2,263,204 | Clark | Nov. 18, 1941 |
| 2,489,118 | Brinker et al. | Nov. 2, 1949 |
| 2,556,060 | Brinker | June 5, 1951 |
| 2,562,360 | Jones | July 31, 1951 |
| 2,739,640 | Brinker | Mar. 27, 1956 |